US011767481B2

(12) United States Patent
Pontes Bittencourt Quitete et al.

(10) Patent No.: US 11,767,481 B2
(45) Date of Patent: Sep. 26, 2023

(54) PROCESS FOR PRODUCING BIODIESEL FROM ACIDIC RAW MATERIALS

(71) Applicant: Petróleo Brasileiro S.A.—Petrobras, Rio de Janeiro (BR)

(72) Inventors: Cristina Pontes Bittencourt Quitete, Rio de Janeiro (BR); Felipe Campos Cauby Coutinho, Niterói (BR); Vitor Loureiro Ximenes, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/888,698

(22) Filed: Aug. 16, 2022

(65) Prior Publication Data

US 2023/0063878 A1 Mar. 2, 2023

(30) Foreign Application Priority Data

Aug. 16, 2021 (BR) .............................. 2021 016123 0

(51) Int. Cl.
*C10L 1/02* (2006.01)
(52) U.S. Cl.
CPC .......... *C10L 1/02* (2013.01); *C10L 2200/0476* (2013.01); *C10L 2230/04* (2013.01); *C10L 2290/141* (2013.01)
(58) Field of Classification Search
CPC ...... H04L 5/00; H04W 52/146; H04W 52/16; H04W 52/242; H04W 52/325; H04W 52/50; H04W 72/04; H04W 72/0453; H04W 72/0473; H04W 74/08; Y02D 30/70

See application file for complete search history.

(56) References Cited

U.S. PATENT DOCUMENTS

| 6,147,196 | A | 11/2000 | Stern et al. |
| 7,256,301 | B2 | 8/2007 | Erguen et al. |
| 7,989,636 | B2 | 8/2011 | Pathi et al. |
| 8,704,003 | B2 | 4/2014 | Essayem et al. |
| 10,888,842 | B2 | 1/2021 | Yoo et al. |
| 10,961,473 | B2 | 3/2021 | Scott |
| 2017/0283723 | A1* | 10/2017 | Jimenez Cruz ...... B01J 27/1802 |

FOREIGN PATENT DOCUMENTS

| AU | 2020203806 A1 * | 7/2020 | |
| BR | 102018009940 A2 | 11/2019 | |
| BR | 132018073474 E2 | 8/2020 | |
| BR | 102021012721 A2 | 12/2022 | |
| WO | 2007083213 A2 | 7/2007 | |
| WO | WO-2007083213 A2 * | 7/2007 | ............. C07C 67/03 |
| WO | 2009047793 A1 | 4/2009 | |
| WO | 2012054946 A1 | 5/2012 | |

* cited by examiner

*Primary Examiner* — Ellen M McAvoy
*Assistant Examiner* — Chantel L Graham
(74) *Attorney, Agent, or Firm* — Mintz Levin Cohn Ferris Glovsky and Popeo, P.C.

(57) ABSTRACT

The present invention concerns a process for producing biodiesel with bifunctional heterogeneous acidic catalysts from acidic raw materials, such as fatty acids and mixtures of fatty acids with triglycerides.

5 Claims, 4 Drawing Sheets

PROCESS FOR PRODUCING BIODIESEL FROM ACIDIC RAW MATERIALS

CROSS-REFERENCE TO RELATED APPLICATION

This application claims priority to Brazilian Application No. 10 2021 016123 0, filed on Aug. 16, 2021, and entitled "PROCESS FOR PRODUCING BIODIESEL FROM ACIDIC CHARGES," the disclosure of which is incorporated herein by reference in its entirety.

FIELD OF THE INVENTION

The present invention concerns a biodiesel production process with bifunctional heterogeneous acidic catalysts from acidic raw materials, such as fatty acids and mixtures of fatty acids with triglycerides.

DESCRIPTION OF THE STATE OF THE ART

In the research of low carbon footprint fuels, as in the production of biodiesel, the esterification reaction plays an important role. FAME (fatty acid methyl ester) can be obtained from esterification using raw material with a high content of fatty acids, such as industrial sludges and residual oils. The esterification reaction (fatty acid+alcohol→ester+water) can be used to increase the yield of an industrial plant for the transesterification of vegetable oils and animal fats, by converting available fatty acids into naturally acidic raw materials, such as animal fats, crude palm oil and frying oil or by-products generated in the industrial unit for treating oils and fats and producing biodiesel (distillate rich in fatty acids, chemical refining sludge and fatty materials).

The esterification processes by heterogeneous catalysis, for the most part, employ high pressures and temperatures, as reported in patents U.S. Pat. No. 7,256,301 (2 to 100 bar (0.2 to 10 MPa), 50 to 300° C.), U.S. Pat. No. 6,147,196 (40 to 100 bar (4 to 10 MPa), 220 to 250° C.) and U.S. Pat. No. 8,704,003 (10 to 75 bar (1 to 7.5 MPa), 150 to 250° C.). These conditions indicate that the catalysts are not very active, since higher temperatures thermodynamically favor the reaction, achieving higher conversions.

The high temperatures and pressures can lead to the formation of undesirable by-products, such as dimethyl ether and compounds derived from the cracking of the raw material, leading to the darkening of the biodiesel and low stability, requiring a greater amount of oxidation-stability additive to be added to the products, increasing the cost of the final product. The methanol/raw material molar ratio should also be minimized, since it leads to a reduction in the operational costs of recovering this excess reagent.

Document WO2012054946 employs a homogeneous catalyst in the esterification of raw materials containing up to 15% m/m of free fatty acid, being able to use other streams from the industrial unit of biodiesel production, such as streams from chemical ("soapstock") or physical deacidification. However, the recovery of the catalyst is done by washing and distillation sequences, the catalysts are organic acids containing sulfur, such as: benzene-1,3-disulfonic acid or naphthalene-1,5-disulfonic acid. In U.S. Pat. No. 10,961,473, $H_2SO_4$ (sulfuric acid) is used in the esterification of raw materials containing 10 to 20% m/m of free fatty acid.

The esterification by heterogeneous catalysis presents some advantages related to the process, when compared to the homogeneous catalysis, performed with inorganic acids, such as, for example: greater ease in the separation of oil and glycerol, due to the non-formation of soaps and emulsions, because the washing step is not necessary to remove salts and neutralize the homogeneous catalyst, and the resulting salt separation. Additionally, less waste is generated and the units have simpler and less expensive metallurgy. It is worthy to highlight that, by employing milder temperature conditions, the generated product suffers less chemical degradation.

The esterification process requires catalysts with high Bronsted acidity, being more easily found in superacidic solids that contain groups with sulfur, for example. U.S. Pat. No. 10,888,842 employs a mixture of $Mn/SiO_2$ oxides, using 170 to 250° C., and pressures from 10 to 60 bar (1 to 6 MPa), and a large amount of methanol or ethanol (e.g.: 40% m/m) in relation to the fed raw materials, indicating that the reaction was shifted to obtain higher conversions when using excess alcohol.

It is noted that some patents report the use of esterification in a preliminary step, thus decreasing the free fatty acid content of the raw material to be fed into the transesterification reactor, as taught in U.S. Pat. No. 7,989,636. In the same way, extraction processes, combined or not with the esterification reaction, can be used to adjust the free fatty acid content of the transesterification reactor raw material, WO2009047793 and WO2007083213.

In view of the disclosure, an efficient process of producing biodiesel with bifunctional heterogeneous acidic catalysts from acidic raw materials, such as fatty acids and mixtures of fatty acids with triglycerides, is necessary, in view of the disadvantages pointed out in the state of the art.

BRIEF DESCRIPTION OF THE INVENTION

The present invention addresses to the integration of a fatty acid esterification unit, by acidic and heterogeneous catalysis, to the pre-treatment and transesterification units. The stream used as the esterification raw material may contain, in addition to fatty acids, triglycerides. It is therefore advantageous for the catalyst to be bifunctional. That is, solids need to be active for transesterification (basic function) and esterification (acid function) reactions. Catalysts developed with this feature were reported in the following patent applications: BR 13 2018 073474-0, BR 10 2018 009940-0, and BR 10 2021 012721-0. A great advantage of the developed solid acidic catalysts is the possibility of carrying out the esterification reaction under relatively mild conditions when compared to the homogeneous acid catalysis, increasing the economy of the process and minimizing the formation of by-products.

The present invention employs milder conditions, in addition to having synergy with the unitary and conversion operations existing in a biodiesel plant, being able to process streams of process, such as: a stream rich in free fatty acid—FFA (for example: 90% FFA, 10% glycerides) from physical deacidification, or olein (fatty acid produced during the neutralization of a soap possibly present in the glycerin tank). The processing of oils with higher fatty acid content, such as palm (4 to 8%), Macaw palm (10 to 40%), and residual oils (10 to 20%) must pass through the vacuum distillation treatment unit to reduce acidity, generating a stream specified for transesterification, and a stream rich in fatty acid that can be esterified. The fatty acid stream, if not used in the industrial unit to increase the volume of biodiesel, is sold at a price lower than biodiesel, possibly three times lower than biodiesel, for the production of soap.

Meanwhile, olein is sold as a fatty material or burned at the plant itself, and it is a material rich in fatty acid with a small percentage of methyl ester.

BRIEF DESCRIPTION OF DRAWINGS

The present invention will be described in more detail below, with reference to the accompanying figures which, in a schematic manner and not limiting the inventive scope, represent examples thereof. In the drawings, there are.

DETAILED DESCRIPTION OF THE INVENTION

Figure 1:
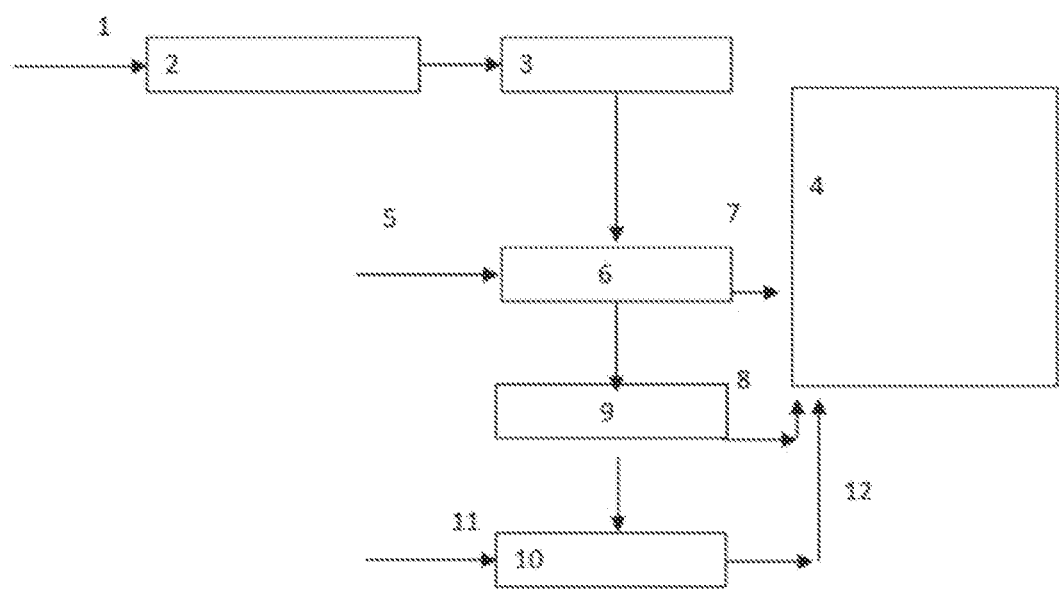
FIG. 1 showing the integration of heterogeneous catalysis to the biodiesel production process in industrial units, wherein: 1—soybean oil, 2—acidic treatment, 3—chemical refining (neutralization/centrifugation), 4—transesterification section, 5—tallow, 6—silica filtration, 7—pre-treated soybean oil, 8—treated tallow, 9—physical refining (distillation), 10—esterification reaction, 11—fatty acid-rich stream, 12—methyl ester-rich stream.

Preliminarily, it is highlighted that the description that follows will start from preferred embodiments of the invention. As will be apparent to any technician skilled on the subject, however, the invention is not limited to these particular embodiments, but only to the scope of protection defined in the claims.

The present invention addresses to the integration of the fatty acid esterification unit, by acidic and heterogeneous catalysis, to the pre-treatment and transesterification units. The stream used as esterification raw material may contain, in addition to fatty acids, triglycerides. It is therefore advantageous for the catalyst to be bifunctional. That is, solids need to be active for transesterification (basic function) and esterification (acid function) reactions. Catalysts developed with this feature were reported in the following patent applications: BR 13 2018 073474-0, BR 10 2018 009940-0, and BR 10 2021 012721-0. The advantages of heterogeneous catalysis are the result of the possibility of producing biodiesel by the processing of more acidic, and consequently cheaper, fatty raw materials. Thus, raw materials with up to 20% m/m of free fatty acids that could be vacuum distilled in the physical refining treatment were evaluated. It is worth to highlight that the catalysts applied to the designed process are quite effective in reducing the acidity of raw materials containing fatty acids, reducing the acidity to values on the order of 2 mg KOH/g, achieving conversions greater than 98% of fatty acid and greater than 70% glycerides in a single reaction step.

The process of producing biodiesel from acidic raw materials has the following main steps:
a) the use of acidic raw materials and triglycerides in the biodiesel production process;
b) the integration of the esterification step via acidic and heterogeneous catalysis with the treatment of oils and fats by physical refining and transesterification for biodiesel production;
c) the use of three integration points of the stream produced in the heterogeneous catalysis reactor (esterification): at the inlet of the transesterification reactor, at the inlet of the transesterification reactor 3 and at the inlet of the washing process of the product of the transesterification section;
d) a heterogeneous catalysis reaction system where the esterification reaction of free fatty acids and the transesterification of the glycerides present in the raw material are carried out concomitantly.
e) a transesterification reaction system consisting of three continuous stirred tank reactors;
f) sending the glycerin to a rectifying tower, while the methyl ester is dried and rectified to produce biodiesel;
g) the methanol-rich stream is rectified to be recycled to the process.

EXAMPLES

Next, so that the invention can be better understood, experiments are presented that illustrate the invention, without, however, being considered limiting.

Example 1

Absence of the esterification process by acidic and heterogeneous catalysis, with the top stream of physical refining being sold as fatty material rich in acids.

Tests were carried out in a process simulator in steady state considering the configuration of processes for raw materials with a free fatty acid (FFA) content above 3.0%, and that there is no maximum acidity limit to be processed in the physical deacidification unit (distillation). Two streams are generated in the distillation, the bottom one, rich in glycerides (FFA<0.2% m/m) that goes to the transesterification section; and the top one rich in fatty acids, but still containing glycerides, which can be processed to obtain biodiesel or sold to the soap industry, FIGS. 1 and 2, exemplified for soybean oil and tallow.

The transesterification reaction system consists of three CSTR reactors in series (reaction section), aiming at the maximum conversion of neutral oil. In the first reactor, the products (methyl ester and glycerin) and unconverted reagents (glycerides and methanol) go to the decanter to remove glycerin from the bottom, and the other components go to the second reactor, using the same sequence of processes. At the end of the third reactor, the product is neutralized and washed to finish the reaction. The glycerin, from the three decanters, is sent to a rectifying tower, while the methyl ester is dried and rectified to be sold as B100 (100% biodiesel), while the methanol-rich stream is rectified to be recycled to the process.

The impact of the variation in the percentage of acidity in the raw material to be mixed with neutral oil (FFA<0.2% m/m) in the proportion of 1:1, totaling the flow rate of 10000 kg/h at the inlet of the transesterification section was evaluated. The physical separation unit, where the deacidification of the acid raw material is carried out, is a rectifier operating under vacuum (1 to 7 mbar (0.1 to 0.7 kPa)), and employing low pressure steam to remove fatty acids from the oil or fat.

In the simulation, three flash drums were used to simulate the physical refining unit at the pressure range of 1 to 7 bar (0.1 to 0.7 MPa). The top stream of the first flash (RF BOTTOM) is the raw material for the esterification unit, while the bottom stream (RF TOP) joins the soybean oil completing the feed to the transesterification reactor (10000 kg/h). In the first flash, the specification of the bottom product was defined, setting the oleic acid recovery composition in the RF BOTTOM, equal to 0.1% m/m. After the third flash, the top stream passes through a heat exchanger (held at 55° C.) and through a separator, returning part of the stream to the third flash.

The conditions of deacidification were adjusted in order to obtain yield and quality similar to that observed on an industrial scale. For comparison purposes, Table 1 presents the balance and composition of the simulated physical refining step and the actual values of an acidic raw material. As already noted earlier, the top stream of physical refining also contains glycerides in addition to free fatty acids.

TABLE 1

Composition and yield of inlet and outlet streams of the physical refining process.

| Composition [% m/m] | Simulated data | | | Actual raw material raw material |
|---|---|---|---|---|
| | Raw material | Top | Bottom | |
| Oleic acid | 4.0 | 79.1 | 0.1 | 3.7 |
| Monoolein | 1.0 | 18.9 | 0.1 | 0.9 |
| Diolein | 5.0 | 2.0 | 5.2 | 5.2 |
| Triolein | 90.0 | 0.0 | 94.7 | 90.2 |
| Methyl oleate | 0.0 | 0.0 | 0.0 | — |
| Methanol | 0.0 | 0.0 | 0.0 | — |
| Glycerol | 0.0 | 0.0 | 0.0 | — |
| Water | 0.0 | 0.0 | 0.0 | — |
| Yield [% m/m] | 100.0 | 4.9 | 95.1 | 100 |

Figure 3:
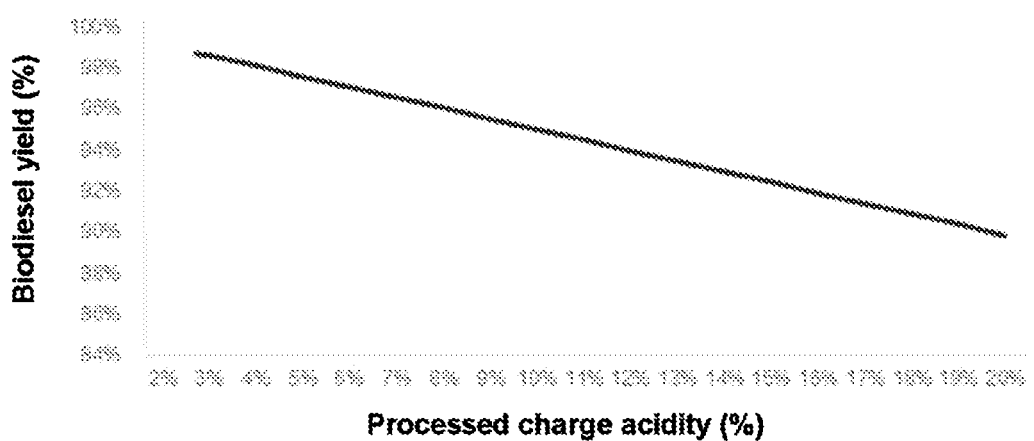
FIG. 3 showing the biodiesel yield as a function of the acidity of the raw material processed in the physical refining for example 1 (process without using free fatty acid).

In the option of selling this top stream as fatty material rich in acids, the greater the acidity of the raw material, the lower the biodiesel yield, because the flow rate of the top distillate stream is increased to the detriment of the bottom rectified stream. This can be clearly seen in FIG. 3, which shows the reduction in biodiesel yield as a function of the increase in acidity of the acidic raw material (50% of the total raw material), ranging from 0 to 20% m/m of free fatty acid, and biodiesel yield ranging from 98.8 to 89.8% m/m.

This option is less attractive for industrial units, since the selling price of fatty acid-rich matter is lower than that of biodiesel. Therefore, heterogeneous catalysis appears as an advantageous option, due to the possibility of converting these glycerides (20% m/m) and fatty acids (80% m/m) dragged at the top, increasing the yield into biodiesel, since the catalyst has activity for both reactions.

Example 2

This example shows the integration of esterification by acidic and heterogeneous catalysis to the transesterification process.

Figure 2:
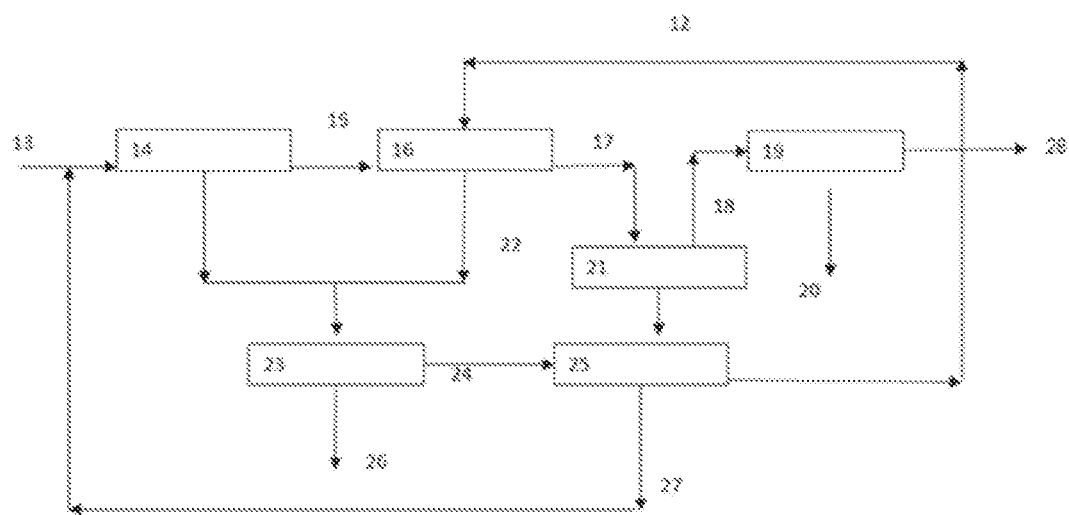
FIG. 2 showing the transesterification section of the industrial units, wherein: 13—raw material with adjusted FFA (free fatty acid) (<0.2% m/m), 14—reaction section, 15—methyl ester, 16—neutralizing and washing, 17—methyl ester/methanol/water, 18—methyl ester, 19—removal of waxes, 20—waxes, 21—drying, 22—glycerin/water/salts/methanol/soap, 23—glycerin concentration, 24—methanol/water, 25—methanol rectification, 26—pure glycerin, 27—methanol, 28—biodiesel.
Figure 4:
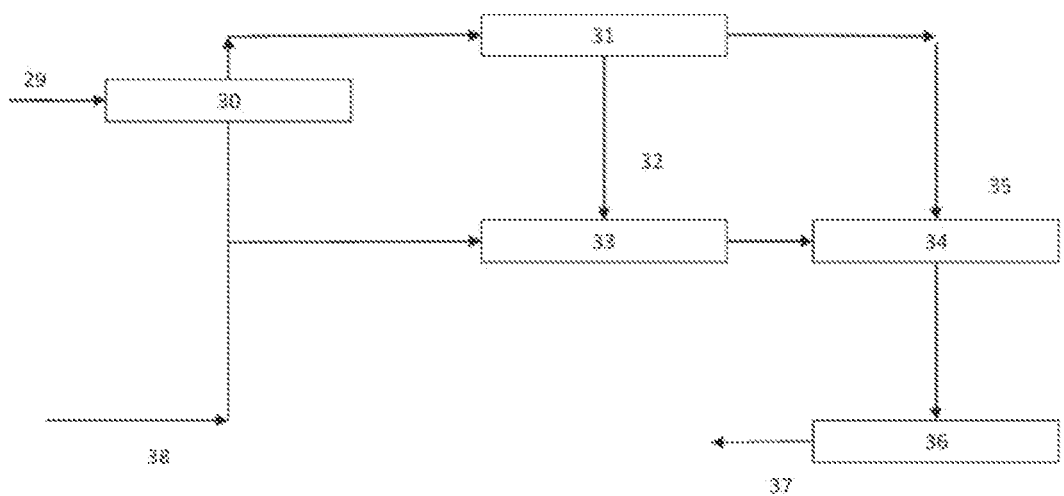
FIG. 4 showing the proposed process scheme for the integration of esterification by acidic and heterogeneous catalysis to the transesterification unit, wherein: 29—Acidic raw material (5,000 kg/h), 30—Physical refining, 31—Esterification, 32—Integration points B (inlet of the catalytic esterification product in the first transesterification reactor) and C (inlet in the third transesterification reactor), 33—transesterification, 34—purification, 35—integration point D (inlet to washing section), 36—rectification, 37—specified B100 (100% biodiesel), 38—neutral raw material (5,000 kg/h).

FIG. 4 presents a simplified scheme of integration of the heterogeneous catalysis process (catalytic esterification) to the transesterification process, referring to FIG. 2. Three integration points were considered, at the inlet of the transesterification reactor (B), at the inlet of the transesterification reactor 3 and at the inlet of the washing process of the product of the transesterification section, as shown in FIG. 4, wherein: case B: inlet of the first reactor, case C: inlet of the third reactor (Point 2 in FIG. 4), Case D: inlet in the washing section (Point 3 in FIG. 4).

For this, an evaluation of processes was carried out, by varying the percentage of acidity of the raw material of the biodiesel production unit. Two conversion conditions were applied, considering experimental results obtained in the laboratory, condition 1: 98% and 37% m/m, condition 2: 98% and 98% for the esterification and transesterification reactions, respectively. The following reactions were considered for the process simulation, according to equations 1 to 4.

Transesterification Reaction:

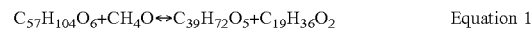

$$C_{57}H_{104}O_6 + CH_4O \leftrightarrow C_{39}H_{72}O_5 + C_{19}H_{36}O_2 \qquad \text{Equation 1}$$

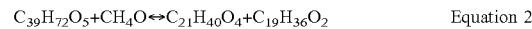

$$C_{39}H_{72}O_5 + CH_4O \leftrightarrow C_{21}H_{40}O_4 + C_{19}H_{36}O_2 \qquad \text{Equation 2}$$

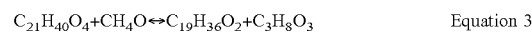

$$C_{21}H_{40}O_4 + CH_4O \leftrightarrow C_{19}H_{36}O_2 + C_3H_8O_3 \qquad \text{Equation 3}$$

Esterification Reaction:

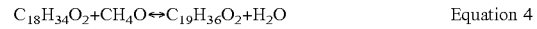

$$C_{18}H_{34}O_2 + CH_4O \leftrightarrow C_{19}H_{36}O_2 + H_2O \qquad \text{Equation 4}$$

Table 2 presents the composition of the inlet and outlet streams of the esterification process by acidic and heterogeneous catalysis, consisting of two conversion reactors in series, one for esterification, and another for transesterification.

TABLE 2

Composition of the inlet and outlet streams of the esterification process by acidic and heterogeneous catalysis (esterification section).

| Composition [% m/m] | Raw material of the esterification section | Methanol | Product of the esterification section |
|---|---|---|---|
| Oleic acid | 79.1 | 0.0 | 1.1 |
| Monoolein | 18.9 | 0.0 | 8.5 |
| Diolein | 2.0 | 0.0 | 0.9 |
| Triolein | 0.0 | 0.0 | 0.0 |
| Methyl oleate | 0.0 | 0.0 | 61.3 |
| Methanol | 0.0 | 100.0 | 23.5 |
| Glycerol | 0.0 | 0.0 | 1.3 |
| Water | 0.0 | 0.0 | 3.5 |

The product of the esterification reaction goes to the transesterification section, consisting of three conversion reactors interspersed by the decanting steps, with the addition of water for washing in the last decanter. The process scheme in the simulation is as shown in FIG. 2.

The RF BOTTOM and RQ DEGUMMED streams are mixed in the proportion of 1:1 to reach a flow rate of 10000 kg/h, forming the raw material of the transesterification section, being heated to 68° C. for entry into the first reactor.

It is observed that the RQ DEGUMMED has in its composition 98% triolein, 1.5% diolein and 0.5% m/m monoolein. The conversions stipulated for the conversion of glycerides were: 90%, 88% and 83%, in order to emulate the actual values found in the intermediate streams. At the outlet of the first transesterification reactor, the product passes through the decanter (flash at 60° C.), separating a stream rich in glycerin (FD1), destined for the glycerin rectification section, and a stream that goes to the second transesterification reactor, whose conversions stipulated in the two reactors were as follows: 90%, 90% and 80%, for triglyceride, diglyceride and monoglyceride, respectively.

In the third transesterification reactor, conversions equal to 90%, 92% and 85% are specified. The product, before going to the decanter, is acidified to finish the transesterification reaction. This acidified stream goes to the third decanter, where the glycerin (FD3) is separated.

The FL3 product goes to the hydrolysis reactor ($C_{19}H_{36}O_2 + H_2O = C_{18}H_{34}O_2 + CH_4O$), being later washed and placed in decantation to separate a part rich in glycerin, which goes to rectification, and the product rich in methyl ester, which also goes to rectification.

The separation of methanol from biodiesel and blonde glycerin is done by rectifying columns, represented here in a simplified way by four flash drums.

The results can be summarized in Table 3, showing that cases B and D (higher severity) are the best options for integrating acid and heterogeneous catalysis esterification into the biodiesel production process by transesterification, using raw materials with up to 16% m/m acidity.

TABLE 3

Comparative table of cases B to D.

| | Conditions of heterogeneous catalysis | |
| --- | --- | --- |
| Process modifications with the addition of the acidity of the ACIDIC RAW MATERIAL (0 to 20% m/m) | Mild (98% esterification and 37% transesterification) | Severe (98% est. and 98% trans.) |
| Need for PROD_ESTERIF drying vessel | Cases B and C | Cases B and C Case D does not require a drying vessel |
| B100 Yield Increase | | All cases. Full use of raw material; lower by-product yields. |
| Increase in the acidity of the TRANS Product (limit 0.25% m/m) | | Cases B: exceeds the limit when reaching 16% m/m acidity in the ACIDIC RAW MATERIAL Case C: exceeds the limit when reaching 13% m/m acidity in the ACIDIC RAW MATERIAL |
| Increase in the Glyceride Content of the Product of Transesterification (Minimum values: 0.2% triglycerides, 0.2% diglycerides and 0.6% monoglycerides) | Cases B and C meet Case D - does not meet | Case D meet |

The sale of the vacuum distillation top stream of the physical refining treatment unit is not advantageous, compared to the integration of esterification via acidic and heterogeneous catalysis to the transesterification process. The integration was evaluated considering two conditions of transesterification (37 and 98%) and esterification (98%). The best option is to perform the integration at the inlet of the transesterification section (reactor 1), Case B, because it is possible to frame the product in relation to the glyceride content even for smaller conversions resulting from the increase in acidity in the esterification raw material, increasing the yield in biodiesel from the unit. It is worthy to highlight that in all the studied options, there is an increase in biodiesel yield with the addition of acidity in the feed processed in the refining. The option of integrating the esterification by acidic and heterogeneous catalysis with the washing section can be advantageous, in the case of high severity, because it was observed that the specification criteria regarding acidity and glyceride content in the B100 were met.

Example 3

Laboratory scale verification: Integration of esterification via acidic and heterogeneous catalysis with the treatment of oils and fats by physical refining and the transesterification for biodiesel production.

This example shows the laboratory verification of example 2: the integration of esterification via acidic and heterogeneous catalysis with the treatment of oils and fats by physical refining and transesterification for biodiesel production.

The integration of the esterification process of acidic raw materials by heterogeneous catalysis with the transesterification process was evaluated, through the insertion of the esterified product at the inlet of the transesterification section (reactor 1), as in FIG. 2, point B. Bench experiment with the esterification product, using it in proportions equal to 6% and 12% by mass in relation to the mixture of refined soybean oil and tallow (1:1). The esterification product was dried in the laboratory, mixed with the raw material of the industrial units of physical refining and transesterification, in two steps, with sodium methoxide. The reaction was carried out at 60° C., methanol/raw material ratio=2.8, time 60 minutes. And in the second step with methanol/raw material ratio equal to 3.0. The centrifugation was performed at 70° C. for 20 minutes.

The transesterification reaction was followed by washing at 60° C. for 3 minutes and drying at 120° C. for 1 hour. After the reaction, the biodiesel was polished with 0.2% m/m of diatomaceous earth, and later filtered through filter paper to measure acidity, RANCIMAT (oxidative stability) and chemical characterization.

The conditions are described in Table 3. The product of the heterogeneous catalysis test, with a TAI (total acidity index) of 14 mg KOH/g, was obtained in the laboratory using a raw material from the top of the vacuum distillation of the physical refining with a TAI of 177 mg KOH/g. Tables 4 and 5 present the chemical characterization of the product and the raw material used in transesterification in the laboratory.

The product of the esterification by acidic and heterogeneous catalysis composed at 6% in the mixture with refined oils and fats was specified in relation to acidity and induction period via RANCIMAT, with acidity equal to 0.04% m/m and oxidative stability time (RANCIMAT) of 10.42 h. The product obtained in the transesterification with 12% m/m of the heterogeneous catalysis product presented 0.03% m/m of acidity, lower than recommended (ANP Resolution No. 45 of Aug. 25, 2014), equal to 0.25%, and oxidative stability equal to 11.4 h.

The esterification reaction is carried out at a temperature of 150 to 230° C., at a pressure of 10 to 25 bar (1 to 2.5 MPa), with a space velocity of 0.18 to 0.45 $h^{-1}$, methanol/raw material molar ratio ranging from 3.0 to 9.0. The transesterification reaction is carried out at a temperature of 55 to 65° C., pressure of 1 to 3 bar (0.1 to 0.3 MPa), contact time of 60 to 120 minutes, methanol/raw material molar ratio ranging from 2.0 to 3.0.

TABLE 4

Characterization by $^{13}$C NMR.

| Content (% m/m) | Product of transesterification* | Raw material of transesterification |
|---|---|---|
| Methyl ester | 100 | 5.2 |
| Triglyceride | 0.0 | 94.8 |
| Diglyceride | 0.0 | 0.0 |
| Monoglyceride | 0.0 | 0.0 |
| glycerin | 0.0 | 10.1 |
| biodiesel | 100 | 5.2 |

TABLE 5

Characterization of raw material and product.

| Raw Material (% m/m)* | | Product (% m/m) | |
|---|---|---|---|
| Saturated Triglycerides (C18:0) | 41.0 | Saturated Methyl Ester (C18:0) | 40.5 |
| Monounsaturated Triglycerides (C18:1) | 28.5 | Monounsaturated Methyl Ester (C18:1) | 24.3 |
| Diunsaturated Triglycerides (C18:2) | 23.5 | Diunsaturated Methyl Ester (C18:2) | 28.8 |
| Polyunsaturated triglycerides (C18:3) | 6.9 | Polyunsaturated methyl ester (C18:3) | 6.4 |
| Ricinoleic Triglycerides (C18:1 OH) | 0.0 | Methyl Ricinoleate (C18:1:OH) | 0.0 |
| Triglycerides with conjugated double bonds (C18:3) | 0.0 | Esters with conjugated double bonds (C18:3) | 0.0 |
| Triglycerides C 22:6 | 0.0 | Methyl ester C22:6 | 0.0 |
| Triglycerides C 20:5 | 0.0 | Methyl ester C20:5 | 0.0 |
| Total Triglycerides | 100 | Total Methyl Esters | 100 |
| Average molecular mass | 829 | Average molecular mass | 279 |
| Iodine Index | 80.7 | Iodine Index | 83.2 |

Note:
*6.0% of the product of heterogeneous catalysis + 1:1 soybean oil and bovine tallow.

The developed process presents a series of advantages, such as: 1—Processing of cheaper raw materials and with high fatty acid content, which cannot be used in the usual process, due to acidity restriction; 2—Full use of the raw material (free fatty acids and glycerides); 3—Advantages in relation to the use of homogeneous catalyst, since it is not necessary to neutralize the catalyst, with separation of the resulting salt, resulting in easier separation of oil and glycerol, without the formation of soaps and emulsions, and without washing to remove salts; 4—Process integrating heterogeneous catalysis to the traditional process, with synergy of existing unit operations in biodiesel plants; 5—Product presents less chemical degradation during the esterification process; 6—Greater operational safety of the units, with less waste generation; 7—Units with lower CAPEX (Capital Expenditure).

In addition to the technology being economically attractive, it has a positive environmental impact in relation to the carbon intensity of the produced biodiesel, since it allows the use of residual raw materials, allowing the biodiesel producer to increase its generation of carbon credits, called CBIO.

The invention claimed is:

1. A process for producing biodiesel from acidic raw materials, characterized in that it comprises:
   a) the use of acidic raw materials and triglycerides in the biodiesel production process;
   b) the integration of the esterification step via acidic and heterogeneous catalysis with the treatment of oils and fats by physical refining and transesterification for the production of biodiesel;
   c) the use of three integration points: at the inlet of a first transesterification reactor, at the inlet of a second transesterification reactor and at the inlet of the washing process of the product of the transesterification section;
   d) use of a fixed bed reactor to carry out the esterification step via heterogeneous catalysis;
   e) a transesterification reaction system consisting of three continuous stirred tank reactors in series;
   f) sending the glycerin to a rectifying tower, while the methyl ester is dried and rectified to produce biodiesel; and
   g) the methanol-rich stream is rectified to be recycled.

2. The process according to claim 1, characterized in that the raw material consists of free fatty acids with 85% to 90% m/m and triglycerides with 10 to 15% m/m.

3. The process according to claim 1, characterized in that the heterogeneous solid acidic catalysts are bifunctional, having activity for esterification and transesterification.

4. The process according to claim 1, characterized in that the esterification reaction is carried out at a temperature of 150 to 230° C., pressure of 10 to 25 bar (1 to 2.5 MPa), space velocity of 0.18 at 0.45 h$^{-1}$, methanol/raw material molar ratio ranging from 3.0 to 9.0.

5. The process according to claim 1, characterized in that the transesterification reaction is carried out at the temperature of 55 to 65° C., pressure of 1 to 3bar (0.1 to 0.3 MPa), contact time of 60 to 120 minutes, methanol/raw material molar ratio ranging from 2.0 to 3.0.

* * * * *